US 6,718,381 B1

(12) United States Patent
Herzi

(10) Patent No.: US 6,718,381 B1
(45) Date of Patent: Apr. 6, 2004

(54) REMOVAL NOTIFICATION FOR A COMPUTER SYSTEM

(75) Inventor: Dirie Herzi, Austin, TX (US)

(73) Assignee: Dell USA L.P., Round Rock, TX (US)

( * ) Notice: Subject to any disclaimer, the term of this patent is extended or adjusted under 35 U.S.C. 154(b) by 0 days.

(21) Appl. No.: 09/237,381

(22) Filed: Jan. 26, 1999

(51) Int. Cl.⁷ .......................................... G06F 15/173
(52) U.S. Cl. ................................... 709/224; 709/229
(58) Field of Search .............................. 709/229, 227, 709/224, 223, 203; 713/200, 201

(56) References Cited

U.S. PATENT DOCUMENTS

| | | |
|---|---|---|
| 4,006,460 A | 2/1977 | Hewitt et al. |
| 4,654,638 A | 3/1987 | Clift |
| 4,672,653 A | 6/1987 | Loveless |
| 4,748,654 A | 5/1988 | Gray |
| 5,406,260 A | 4/1995 | Cummings et al. |
| 5,572,528 A * | 11/1996 | Shuen ........................ 370/402 |
| 5,574,786 A | 11/1996 | Dayan et al. |
| 5,610,593 A | 3/1997 | Seto |
| 5,630,058 A | 5/1997 | Mosley et al. |
| 5,675,321 A | 10/1997 | McBride |
| 5,701,411 A | 12/1997 | Tran et al. |
| 5,736,927 A | 4/1998 | Stebbins et al. |
| 5,742,833 A * | 4/1998 | Dea et al. .................... 709/224 |
| 5,802,305 A * | 9/1998 | McKaughan et al. ........ 709/227 |
| 5,974,552 A * | 10/1999 | Lim et al. .................... 713/300 |
| 6,021,493 A * | 2/2000 | Cromer et al. .............. 713/200 |
| 6,052,779 A * | 4/2000 | Jackson et al. ................ 713/2 |
| 6,058,289 A * | 5/2000 | Gardner et al. ............. 370/311 |
| 6,128,658 A * | 10/2000 | McLean ...................... 709/224 |
| 6,205,561 B1 * | 3/2001 | Santerre et al. ............... 714/36 |
| 6,266,696 B1 * | 7/2001 | Cromer et al. .............. 709/224 |

OTHER PUBLICATIONS

"Wired for Management Baseline", Version 2.0 Re;ease Candidate, Specification to help reduce Total Cost of Ownership for business computers, Aug. 28, 1998, Intel Corporation.
"Leader in Reverse 911–Type Technology Finds Data Security Solution That Parallels Its Real–Time Alert Capabilities", Business Wire, Sep. 2, 1998, pp. 1–2.

* cited by examiner

Primary Examiner—Hosain Alam
Assistant Examiner—Philip B. Tran
(74) Attorney, Agent, or Firm—Haynes and Boone, LLP

(57) ABSTRACT

A computer system includes at least one processor, at least one memory, a device for communicating with a prescribed network server, and a mechanism for implementing a removal notification security measure during at least a low power mode of the computer system. The security measure includes the transmitting of a security packet to the prescribed network server at prescribed intervals subsequent to the computer system entering the low power mode.

38 Claims, 1 Drawing Sheet

REMOVAL NOTIFICATION FOR A COMPUTER SYSTEM

BACKGROUND

The disclosures herein relate generally to computer systems, and more particularly, to security of a computer system such as a portable notebook computer.

Current security measures used with respect to portable computers and computer systems fail to prevent authorized users from stealing a respective portable computer or computer system. One current security measure includes use of a system password for enabling a user to use a prescribed computer system. The system password however does not prevent anyone who knows the password from stealing the computer and thereafter being able to continue using the computer. Another security measure includes the use of a hard disk drive password. The use of a hard disk drive password only serves to protect the hard disk drive, and can be bypassed by merely replacing the hard disk drive. Other security measures include the use of various locks and other physical attachment devices. A committed individual can forcibly remove such physical attachments, whereas, an authorized user with an appropriate key can merely use the key to unlock the computer from its physical constraint and thereby steal the computer. Lastly, a security measure making use of operating system level passwords can be bypasses by reinstalling of the computer operating system. The use of operating system level passwords thus does not provide a very high level of security against computer theft by an authorized user.

In addition to the above described security measures, there is no convenient way of knowing when a notebook computer (or other computer system) coupled to a network has been stolen or removed without authorization. Such information could be very useful for security personnel. That is, given an ability to know when a computer is removed or otherwise disconnected from the network, security applications could be written which track the presence of such computers connected to the network. Security personnel could then be notified if a computer system is removed without proper authorization.

It would thus be desirable to provide an improved level of security and an improved security measure against undesired theft of a computer system, especially, a portable computer system coupled to a computer network.

SUMMARY

According to one embodiment, a computer system includes at least one processor, at least one memory, a device for communicating with a prescribed network server, and a mechanism for implementing a removal notification security measure during at least a low power mode of the computer system. The security measure includes the transmitting of a security packet to the prescribed network server at prescribed intervals subsequent to the computer system entering the low power mode.

The embodiments of the present disclosure provide a technical advantage of an improved level of security and an improved security measure against undesired theft of a computer system, especially, a portable computer system coupled to a computer network.

BRIEF DESCRIPTION OF THE DRAWINGS

The foregoing and other teachings and advantages of the present invention will become more apparent upon a detailed description of the best mode for carrying out the invention as rendered below. In the description to follow, reference will be made to the accompanying drawings, in which.

DETAILED DESCRIPTION OF THE PREFERRED EMBODIMENT

Figure 1:
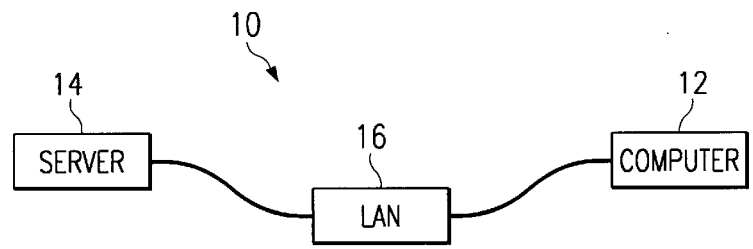
FIG. 1 illustrates a computer network for implementing removal notification of a computer system according to a security measure embodiment of the present disclosure.

Referring to FIG. 1, a computer network 10 for implementing removal notification of a computer system 12 according to one embodiment of the present disclosure is illustrated. A prescribed network server 14 provides for an administration of the removal notification security measure, further as discussed herein. The computer system 12 is coupled to the network server 14 via any suitable interface 16 for communicating between the same, such as with the use of a local area network interface, Internet connection, Intranet connection, modem, or the like. Computer 12 can include any type of computer system, such as a desktop personal computer system unit or a portable (notebook) personal computer system unit. Computer network 10 for implementing removal notification of a computer system can thus include a network server 14 for administering a removal notification security measure and at least one computer system 12, as further discussed herein.

Embedded controller 32 includes any suitable microcontroller which can be embedded on a computer system motherboard to process keyboard and pointing device activity. Embedded controller 32 may include a model 8051 microcontroller, such as commercially available from Intel Corporation of Santa Clara, Calif. Since the power requirements of microcontrollers have improved, the microcontrollers can be used to handle other dynamic events such as power buttons, docking, and thermal control in a computer system. The microcontroller can be used to do some tasks previously done by the processor. In view of low power consumption, if desired, the microcontroller can be run even when the computer system is OFF. Microcontrollers are known in the art and thus only briefly discussed herein.

Figure 2:
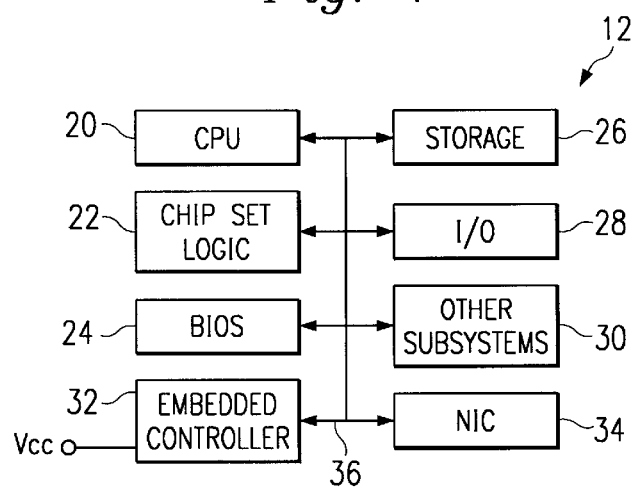
FIG. 2 illustrates a block diagram of a computer system having removal notification according to the embodiments of the present disclosure.

Turning now to FIG. 2, a system block diagram of a computer system 12 configured in accordance the present embodiments as discussed herein. The computer system 12 includes a central processing unit (CPU) 20, chip set logic 22, basic input output system (BIOS) firmware 24, storage, such as a floppy disk drive, hard disk drive, CD-rom drive, and/or other storage devices, collectively designated by reference numeral 26, input/output (I/O) devices, such as a display, a keyboard, a mouse, and associated controllers, collectively designated by a reference numeral 28, and various other subsystems and/or memory, such as a modem, timer, random access memory (RAM), non-volatile random access memory (NVRAM), read only memory (ROM), etc., all collectively designated by a reference numeral 30, an embedded controller 32, and a network interface controller (NIC) 34, all interconnected via one or more suitable buses, shown collectively in FIG. 2 as bus 36. The various buses may include a PCI bus, for example. Power (Vcc) is provided to the embedded controller 32 via a suitable power supply (not shown), even when the computer system 12 is in a low power mode.

With respect to the present embodiments, the BIOS firmware includes program code for performing steps as discussed further herein below in the removal notification of a computer system. The program code for the BIOS firmware may be written for performing the various functions, as described and discussed herein, using techniques known in the art.

According to the present embodiments, a computer system, for example, a desktop system or a notebook system, is coupled to a prescribed server on a given network. In the instance of a notebook computer, the computer can be coupled to the network server via a docking station which includes an appropriate network interface. Periodic security packets are sent out by the computer system to the network, in particular to the prescribed server on the network. When the computer system is removed and/or otherwise disconnected from the network, the transmission of the security packets ceases. Such ceasing of the transmission of security packets is an indication to the network server that the computer system has been removed and/or the occurrence of a network connection interruption. System management software running on the network server can then execute prescribed security procedures as may be deemed appropriate for a given computer system/network configuration security policy.

The security packets can be transmitted by the computer system when the computer is operating in a low power mode. Such an operation of transmitting security packets provide a method for indicating a continued network connection or communication between the computer system and the network server. In the absence of any unexpected interruptions in network communication, the sending of security packets during low power mode provides a level of assurance that the computer system is present and has not been removed. Sending of security packets can also be performed during a full power mode if so desired according to a particular security policy.

According to the present embodiments, notification or the sending of security packets can be implemented as follows. One method of implementing the security notification is with the use of a network interface controller (NIC) in conjunction with an embedded controller. Another method of implementing the security notification is with the use of a processor at the CPU level. In each embodiment, the network interface controller is to be sufficiently powered during an OFF and low power states of the computer system.

With respect to the first embodiment having a NIC and embedded controller, the embedded controller is set up in a prescribed manner to routinely wake up and access the NIC through a suitable bus. Upon the entering of the low power mode by the computer system, the embedded controller initiates a timer for activating the removal notification security measure. The embedded controller provides for a loading of a security packet and then sending the security packet to the network server via the NIC. As a result, the embedded controller transmits a message to the network server, wherein the message essentially informs the network server that the computer system is still present on the network, i.e., coupled to the network. The computer system thus is able to send a security message to the network server on a periodic basis to inform the network server that the computer system is still there. When the computer system is removed and/or the network interface connection broken, then the network server running system management software can easily detect that corrective action is needed. The particular corrective action will depend upon a prescribed security policy for the given computer network.

Figure 3:
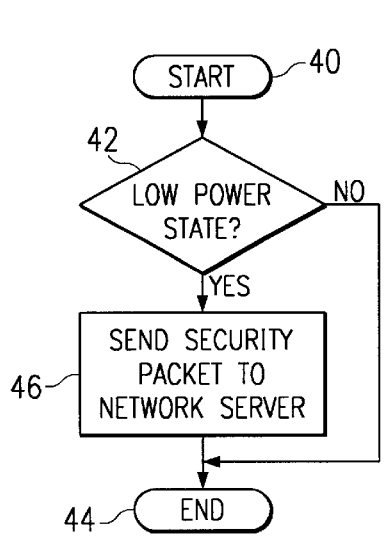
FIG. 3 is a flow diagram of one method for implementing removal notification of a computer system according to one embodiment of the present disclosure.

Referring now to FIG. 3, the removal notification process begins with step 40 upon an occurrence of a timed event, for example, a suitable interrupt generated from a real time clock or other timer. In step 42, an inquiry as to whether or not the computer system is in a low power mode or state is made. If the computer system is not in a low power state, then the process ends at step 44. However, if the computer system is in a low power state, then the process continues with step 46. In step 46, a security packet is transmitted or sent to the network server. The process ends at step 44. The network server, upon receiving the security packet, processes the same according to a prescribed security policy for the given computer system and network configuration. It is assumed that when the computer system is in a prescribed power mode other than a low power mode, the computer is actively interacting with the network. In such a case, the network will readily know that the computer system is present.

With respect to the use of a processor at a CPU level for implementing the security measure of the present disclosure, the processor is instructed via suitable program code (e.g., in the BIOS firmware or chip set logic) and prescribed system management interrupts (SMI) for carrying out the security measure. That is, the processor is instructed upon the occurrence of an SMI to wake up and transmit the security packet to the network server. The processor does so, for example, with the use of a real time clock (RTC) or a chip set timer. The RTC or chip set timer are set to wake up at a prescribed time or given interval, wherein the RTC or chip set timer are enabled upon the occurrence of the computer system entering a low power mode. Other methods to wake up the CPU may also be possible.

Upon wake up, the processor accesses any available NIC on the computer system that has a link to the network server. For example, the processor can access the NIC through a PCI bus and then transmit a prescribed security packet. Once the security packet is transmitted successfully, the processor can re-set up the wake up timer (or timers) and return to its previous low power state (e.g., suspend and/or soft-OFF).

Figure 4:
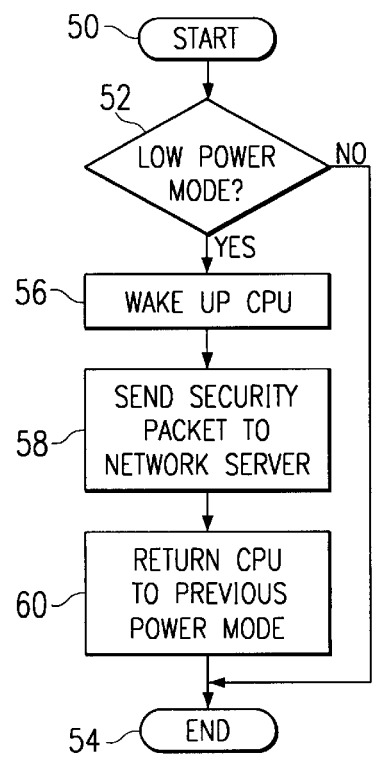
FIG. 4 illustrates a flow diagram of another method for implementing removal notification of a computer system according to another embodiment of the present disclosure.

Turning now to FIG. 4, the removal notification process begins with step 50 upon an occurrence of a timed event, for example, a suitable interrupt generated from a real time clock or other timer. In step 52, an inquiry as to whether or not the computer system is in a low power mode or state is made. If the computer system is not in a low power state, then the process ends at step 54. However, if the computer system is in a low power state, then the process continues with step 56. In step 56, the CPU is powered up. In other words, a system level interrupt and management routine initiates a wake up of the CPU. In step 58, a security packet is transmitted or sent to the network server. In step 60, the CPU is returned to its previous power mode. The process ends at step 54. As with the first embodiment, the network server, upon receiving the security packet, processes the same according to a prescribed security policy for the given computer system and network configuration. It is further assumed that when the computer system is in a prescribed power mode other than a low power mode, the computer is actively interacting with the network. In such a case, the network will readily know that the computer system is present.

With respect to the prescribed security packet, the security packet to be transmitted includes at least a computer system identifier. The computer system identifier informs the system management software running on the network server the identity of the computer transmitting the security packet or message. The identifier can include any unique identifier, for example, a universally unique identifier (UUID) and/or a globally unique identifier (GUID), such as defined in the Wired For Management Baseline, version 1.81 or later.

While the method and apparatus of the present disclosure have been particularly shown and described with reference to the various embodiments thereof, it will be understood by those skilled in the art that various changes in form and detail may be made therein without departing from the spirit and scope of the method and apparatus, as set forth in the following claims.

What is claimed is:

1. A computer system comprising:
    a processor;
    a memory;
    device for communicating with a network server; and
    means for implementing a computer system initiated removal notification security measure in response to an occurrence of a timed event during a low power mode of said computer system, said means for implementing the security measure configured to initiate, in response to said computer system entering the low power mode and at prescribed intervals only subsequent to said computer system entering the low power mode, periodic transmissions of a security packet from said computer system to the network server via said communicating device, said means for implementing the security measure including a network interface controller (NIC), sufficiently powered during an OFF state and a low powered state of the computer system, the NIC linking with the network server via one of an embedded controller and the processor, wherein a receipt of the periodic transmissions of the security packet by the network server is indicative of a continued network connection and wherein a ceasing of the receipt of the periodic transmissions by the network server is indicative of a discontinued network connection, corresponding to a notification that said computer system may have been removed.

2. The computer system of claim 1, wherein the security packet includes at least a computer system identifier.

3. The computer system of claim 1, wherein the security packet is a universally unique identifier (UUID).

4. The computer system of claim 1, wherein the security packet is a globally unique identifier (GUID).

5. The computer system of claim 1, wherein the embedded controller is activated at the prescribed intervals for transmitting the security packet via said communicating device from said computer system to the network server.

6. The computer system of claim 5, wherein the prescribed intervals for removal notification are fixed intervals.

7. The computer system of claim 5, wherein the prescribed intervals for removal notification are intervals subject to being changed in accordance with requirements of a particular removal notification security measure implementation.

8. The computer system of claim 1, wherein said means for implementing the removal notification security measure includes the basic input output system (BIOS) firmware, the BIOS firmware including instructions executable by said at least one processor for transmitting the security packet via said communicating device to the network server.

9. The computer system of claim 8, wherein the BIOS firmware is accessed in response to the occurrence of a prescribed system management interrupt, the system management interrupt having been generated in response to a prescribed timer.

10. The computer system of claim 9, further wherein the prescribed timer includes at least one of a real time clock and a chip set logic timer.

11. The computer system of claim 1, wherein said communicating device includes a modem.

12. A computer network comprising:
    a network server for administering a removal notification security policy; and
    a computer system, said computer system including:
        a processor;
        a memory;
        device for communicating with said network server; and
        means for implementing a computer system initiated removal notification security measure in response to an occurrence of a timed event during a low power mode of said computer system, said means for implementing the security measure configured to initiate, in response to said computer system entering the low power mode and at prescribed intervals only subsequent to said computer system entering the low power mode, periodic transmissions of a security packet from said at least one computer system to said network server via said communicating device, said means for implementing the security measure including a network interface controller (NIC), sufficiently powered during an OFF state and a low powered state of the computer system, the NIC linking with the network server via one of an embedded controller and the processor, wherein a receipt of the periodic transmissions of the security packet by said network server is indicative of a continued network connection and wherein a ceasing of the receipt of the periodic transmissions by said network server is indicative of a discontinued network connection, corresponding to a notification that said computer system may have been removed.

13. The computer network of claim 12, wherein the security packet includes at least a computer system identifier, the computer system identifier including one of a universally unique identifier (UUID) and a globally unique identifier (GUID).

14. The computer network of claim 12, wherein embedded controller is activated at the prescribed intervals for transmitting the security packet via the communicating device from said computer system to said network server.

15. The computer network of claim 12, wherein the means for implementing the removal notification security measure includes basic input output system (BIOS) firmware, the BIOS firmware including instructions executable by the processor for transmitting the security packet via the communicating device to said network server.

16. The computer network of claim 15, wherein the BIOS firmware is accessed in response to the occurrence of a prescribed system management interrupt, the system management interrupt having been generated in response to a prescribed timer.

17. The computer network of claim 16, further wherein the prescribed timer includes at least one of a real time clock and a chip set logic timer.

18. The computer network of claim 12, wherein the communicating device includes a modem.

19. A method of implementing removal notification of a computer system comprising:

providing a processor;

providing a memory;

providing a device for communicating with a network server; and implementing a computer system initiated removal notification security measure in response to an occurrence of a timed event during a low power mode of the computer system, wherein implementing the security measure includes initiating, in response to the computer system entering the low power mode and at prescribed intervals only subsequent to the computer system entering the low power mode, periodic transmissions of a security packet from the computer system to the network server, via the communicating device, further wherein implementing the security measure includes a network interface controller (NIC), sufficiently powered during an OFF state and a low powered state of the computer system, the NIC linking with the network server via one of an embedded controller and the processor, wherein a receipt of the periodic transmissions of the security packet by the network server is indicative of a continued network connection and wherein a ceasing of the receipt of the periodic transmissions by the network server is indicative of a discontinued network connection, corresponding to a notification that the computer system may have been removed.

20. The method of claim 19, wherein the security packet includes at least a computer system identifier.

21. The method of claim 19, wherein the security packet is a universally unique identifier (UUID).

22. The method of claim 19, wherein the security packet is a globally unique identifier (GUID).

23. The method of claim 19, wherein the embedded controller is activated at the prescribed intervals for transmitting the security packet via the communicating device from the computer system to the network server.

24. The method of claim 23, wherein the prescribed intervals for removal notification are fixed intervals.

25. The method of claim 23, wherein the prescribed intervals for removal notification are intervals subject to being changed in accordance with requirements of a particular removal notification security measure implementation.

26. The method of claim 19, wherein implementing the removal notification security measure includes providing basic input output system (BIOS) firmware, the BIOS firmware including instructions executable by the at least one processor for transmitting the security packet via the communicating device to the prescribed network server.

27. The method of claim 26, wherein the BIOS firmware is accessed in response to the occurrence of a prescribed system management interrupt, the system management interrupt having been generated in response to a prescribed timer.

28. The method of claim 27, further wherein the prescribed timer includes at least one of a real time clock and a chip set logic timer.

29. The method of claim 19, wherein the communicating device includes a network interface controller.

30. The method of claim 19, wherein the communicating device includes a modem.

31. A method of implementing removal notification of a computer system in a computer network comprising:

providing a network server for administering a removal notification security policy; and providing a computer system, the computer system including:

providing a processor;

providing a memory;

providing a device for communicating with the network server; and implementing a computer system initiated removal notification security measure in response to an occurrence of a timed event during a low power mode of the at least one computer system, wherein implementing the security measure includes initiating, in response to the computer system entering the low power mode and at prescribed intervals only subsequent to the computer system entering the low power mode, periodic transmissions of a security packet from the computer system to the network server, via the communicating device, further wherein implementing the security measure includes a network interface controller (NIC), sufficiently powered during an OFF state and a low powered state of the computer system, the NIC linking with the network server via one of an embedded controller and the processor, wherein a receipt of the periodic transmissions of the security packet by the network server is indicative of a continued network connection and wherein a ceasing of the receipt of the periodic transmissions by the network server is indicative of a discontinued network connection, corresponding to a notification that the computer system may have been removed.

32. The method of claim 31, wherein the security packet includes at least a computer system identifier, the computer system identifier including one of a universally unique identifier (UUID) and a globally unique identifier (GUID).

33. The method of claim 31, wherein the embedded controller is activated at the prescribed intervals for transmitting the security packet via the communicating device from the computer system to the network server.

34. The method of claim 31, wherein implementing the removal notification security measure includes providing basic input output system (BIOS) firmware, the BIOS firmware including instructions executable by the processor for transmitting the security packet via the communicating device to the network server.

35. The method of claim 34, wherein the BIOS firmware is accessed in response to the occurrence of a prescribed system management interrupt, the system management interrupt having been generated in response to a prescribed timer.

36. The method of claim 35, further wherein the prescribed timer includes at least one of a real time clock and a chip set logic timer.

37. The method of claim 31, wherein the communicating device includes a network interface controller.

38. The method of claim 31, wherein the communicating device includes a modem.

* * * * *